(12) United States Patent
Huylebroeck (10) Patent No.: US 7,653,017 B2
(45) Date of Patent: Jan. 26, 2010

(54) BLUETOOTH SNIFF MODE POWER SAVING

(75) Inventor: Marc Huylebroeck, Hoboken (BE)

(73) Assignee: STMicroelectronics N.V., Amsterdam (NL)

( * ) Notice: Subject to any disclaimer, the term of this patent is extended or adjusted under 35 U.S.C. 154(b) by 426 days.

(21) Appl. No.: 11/045,806

(22) Filed: Jan. 28, 2005

(65) Prior Publication Data
US 2005/0169201 A1     Aug. 4, 2005

(30) Foreign Application Priority Data
Jan. 30, 2004   (EP) .................... 04447024

(51) Int. Cl.
*G04C 17/00*   (2006.01)
(52) U.S. Cl. .............. 370/311; 370/328; 370/350; 455/41.2; 713/300
(58) Field of Classification Search ........... 370/311, 370/350, 328, 504; 455/41.2, 574, 73, 11.1; 709/236; 375/354; 713/300
See application file for complete search history.

(56) References Cited

U.S. PATENT DOCUMENTS 6,711,151 B1 *  3/2004  Ziegler ............ 370/350
2002/0031196 A1 *  3/2002  Muller et al. ............ 375/354
2002/0120706 A1 *  8/2002  Murphy ............ 709/208
2002/0136268 A1 *  9/2002  Gan et al. ............ 375/133
2002/0193073 A1 * 12/2002  Fujioka ............ 455/41
2003/0176200 A1 *  9/2003  Harrison ............ 455/500
2003/0186683 A1 * 10/2003  Yamato ............ 455/411
2004/0148426 A1 *  7/2004  Hur et al. ............ 709/236
2004/0203389 A1 * 10/2004  Kojima et al. ............ 455/41.2
2004/0242163 A1 * 12/2004  Karr et al. ............ 455/73

* cited by examiner

*Primary Examiner*—Danh C Le
(74) *Attorney, Agent, or Firm*—Lisa K. Jorgenson; James H. Morris; Wold, Greenfield & Sacks, P.C.

(57) ABSTRACT

A Bluetooth master radio frequency unit addresses a slave radio frequency unit, to enable the slave to synchronize to the master, by sending poll packets and optionally null packets over an active link, the master being arranged so that receipt of a response from the slave unit to a poll packet is sufficient to maintain the active link. The slave unit does not have to respond to all of the poll packets. This approach can allow the slave to preserve more (transmit) power by going into a deep sleep mode in which a low power oscillator may be used while still allowing the master unit to detect whether the slave has resynchronized or not (and thus to update a Link Supervision Timer, for example).

28 Claims, 2 Drawing Sheets

BLUETOOTH SNIFF MODE POWER SAVING

BACKGROUND OF THE INVENTION

1. Field of the Invention

This invention relates to methods of obtaining low power operation for a telecommunications device using a telecommunications protocol, especially a wireless protocol, such as the Bluetooth protocol, to apparatus and software for carrying out such methods, and in particular to providing low power operation when a telecommunications device such as a Bluetooth slave device is has a radio link in Sniff mode.

2. Discussion of the Related Art

Bluetooth is a well known short-range radio link intended to replace the cable(s) connecting portable and/or fixed electronic devices. Full details are available from Bluetooth SIG which has its global headquarters in Overland Park, Kans., USA. Key features are robustness, low complexity, low power, and low cost. Bluetooth operates in the unlicensed ISM band at 2.4 GHz. Frequency hopping is applied to combat interference and fading. A slotted channel is used with a nominal slot length of 625 μs. On the channel, information is exchanged through packets. In Bluetooth version 1.1 each packet is transmitted on a different hop frequency. In Bluetooth version 1.2 it is proposed that transmission and receive packets may be sent on the same frequency. The Bluetooth protocol uses a combination of circuit and packet switching. Slots can be used for asynchronous operation or can be reserved for synchronous packets. Descriptions of the Bluetooth standards can be found in "Discovering Bluetooth", M. Miller, Sybex, 2001; "Bluetooth: connect without cables", J. Bray and C. F. Sturman, Prentice-Hall, 2001 as well as from the Bluetooth standards themselves.

Wireless Bluetooth devices are often battery powered and can support an HID (Human Interface Device) profile and can act as a slave device. Typically, such battery powered HID devices are:

Bluetooth wireless keyboard
Bluetooth wireless mouse
Bluetooth wireless game controller The Bluetooth system can provide a point-to-point connection (only two Bluetooth units involved), or a point-to-multipoint connection. In the point-to-multipoint connection, the channel is shared among several Bluetooth units. Two or more units sharing the same channel form a piconet. One Bluetooth unit acts as the master of the piconet, whereas the other unit(s) acts as slave(s). Up to seven slaves can be active in the piconet. In addition, many more slaves can remain locked to the master in a so-called parked state. These parked slaves cannot be active on the channel, but remain synchronized to the master. Both for active and parked slaves, the channel access is controlled by the master. Units can also be in a hold mode or a sniff mode.

The best battery operated device dedicated for most applications is the one that has the lowest power consumption and so the longest battery life time without any degradation in functionality. Any possibility to save power consumption must be considered by the designer. The Bluetooth specification has defined a few low power modes. Possible BT low power modes are: hold, sniff and park.

Hold mode allows devices to be inactive for a certain time. It does not affect synchronous traffic. During hold mode all asynchronous traffic is stopped for a specified period of time. It is left entirely up to a held device if it switches off its receiver during the hold period. A parked device gives up its active member address and ceases to be an active member of a piconet. It cannot transmit in park mode nor can it be actively addressed by a master unit. It wakes up periodically to listen for transmissions from the master device at pre-arranged beacon instants. The master unit transmits to slave units using a periodic beacon. As the beacon messages receive no reply from parked slave units, the beacon is simply transmitted at regular intervals. The slave units use the beacon messages to synchronize their internal clocks. Both a master and a slave unit may send messages to end the park mode. A parked slave unit can sleep during beacon signals. This is set by the master which tells a slave unit how long it can sleep by specifying the number of beacon signals $N_{Bsleep}$ it can sleep through. A parked unit may make use of a less accurate low power oscillator so the timing may drift away if the parked unit remains asleep too long. To make sure all parked slave units stay synchronized a master unit can unpark and park them at regular intervals.

Similar to the park mode, a slave in sniff mode periodically wakes up to listen to transmissions from the master and to re-synchronize its clock offset. For the HID profile, when devices are active (currently in use) the sniff mode is commonly used. The nature of HID devices are as such that a data flow might be required at each moment. For this reason the park and holdmode are not so suitable for these kind of devices, while the sniff mode is well suited. In the sniff mode, the duty cycle of the slave's listening activity can be reduced. If a slave participates on a link, it has to listen in every slot to the master traffic. With the sniff mode, the time slots where the master can start transmission to a specific slave is reduced; that is, the master can only start transmission in specified time slots. These so-called sniff slots are spaced regularly with an interval of $T_{sniff}$. Thus, the sniff mode may be described as the provision of periodic moments in time when communication from the master can occur, these times being at longer intervals than available during normal operation. The sniff parameters, interval and attempts, are always initiated by the slave HID device. The slave HID device will always select the sniff parameters. It must always choose the parameters such that the data rate it receives data is lower than the data rate it can report to the master and take care that the latency to sent the data is within the limits the application requires. So, the master starts polling the slave at the sniff interval for a number of sniff attempts. In case the slave device has got no data to send it replies with a NULL packet otherwise it replies with the data packet. The slave starts listening at the sniff slots for $N_{sniff}$ attempt consecutive receive slots unless a packet with matching address is received. After every reception of a packet with matching address, the slave continues listening at the subsequent $N_{sniff}$ timeout or remaining of the receive slots, whichever is greater. So, for $N_{sniff}$ timeout>0, the slave continues listening as long as it receives packets with matching address. To enter the sniff mode, the master or slave can issue a sniff command message. This message will contain the sniff interval $T_{sniff}$ and an offset $D_{sniff}$. The timing of the sniff mode is then determined. It is known to vary the parameters $T_{sniff}$ and $N_{sniff}$ according to backlogs of data to be transmitted between each of a number of different slaves, to save overall power consumption of the slaves. In Bluetooth version 1.2 the $N_{sniff}$ timeout is used after the slave has transmitted a data packet. The $N_{sniff}$ timeout is not used when only POLL/NULL packets have been exchanged.

NULL packets can be sent by a master and used by the slave to maintain synchronization. The POLL packet is very similar to the NULL packet. It does not have a payload either. In contrast to the NULL packet, it requires a confirmation from the recipient. Upon reception of a POLL packet the slave must respond with a packet. This return packet is an implicit acknowledgement of the POLL packet. The Poll packet can be used by the master in a piconet to poll the slaves, which must then respond even if they do not have information to send.

As mentioned, the master polls the slave. In the case that it didn't receive any reply within a link supervision time it will declare the link as lost—a link supervision timeout. Also at the slave, the slave replies to the poll packets. In the case it didn't receive any poll packet within the link supervision time it will declare the link as lost.

Synchronization is important for ad-hoc connections. In the Bluetooth system, each unit has a free-running native clock which has an accuracy of 20 ppm when the unit is active and 250 ppm when the unit is in a low-power mode. When a unit wants to page another unit, it can speed up the connection establishment when it knows the recipient's native clock. This clock information should be stored during a previous connection stage. A Bluetooth unit can thus have a list of unit addresses with corresponding native clocks it can use when paging one of those units. The clock information is stored as a time offset to its own native clock. When a piconet is in operation, it is the native clock in the master that determines the timing. The slaves add an offset to their native clocks in order to be hop synchronized to the master. The slave's native clock plus the offset with respect to the master provide the proper input to the hop selection scheme. Since the native clocks of the master and the slave are free-running, the offset in the slaves has to be adjusted continuously to compensate for drift. The reception of packets sent by the master is used to adjust the offset. The access code in front of the packet has the proper autocorrelation properties to enable a slave to derive the timing.

A master needs to send a poll packet occasionally, to maintain its awareness of other slaves within range, and to maintain synchronization of such slaves. The number of poll packets sent should be kept to a minimum to avoid the power cost of causing these slaves to have to transmit. Transmitting usually costs more power than receiving and so contributes to draining the batteries of units which are presumably trying to save power by being in the sniff mode. Where resources are scarce and must be used in an efficient way the ratio of the number of POLL and NULL packets to the number of data packets should be minimized. Besides this efficiency goal, a polling master in Bluetooth should also be fair. In the Bluetooth best effort case, fairness implies that slaves get the same fraction of their fair share of communication time where the fair share is determined by rules.

For scheduling POLL packets during Sniff mode, several scheduling algorithms are known and are in use in commercially available devices. The more advanced algorithms stop scheduling POLL packets (and start scheduling NULL packets) in the sniff attempts when the slave has synchronized (i.e. when the slave did respond with a NULL packet). In other words when the slave has synchronized, it is sufficient to send NULL packets for the remaining master Tx slots of the sniff attempts. This algorithm is not suitable for implementations that are using a "prescheduling algorithm". In "prescheduling implementations", Tx/Rx packet pairs are allocated in advance. For a master (using a prescheduling algorithm) of a Bluetooth link in sniff mode, this means that the master does not know in advance (i.e. at the time the actual scheduling occurs) when the slave will be synchronized. One possible solution to this problem is to send POLL packets in every Tx slot of the Sniff attempts, but this costs transmit power at the slave side (since the slave is obliged to respond to POLL packets).

A Bluetooth device has the lowest power consumption in the case where it can run on a low power oscillator clock, also referred to as the deep sleep mode. Unfortunately, activating or deactivating this power mode requires some time. The ideal situation is that the device can go into the deep sleep mode in between the sniff intervals. Unfortunately, for most devices the sniff interval is too short in active mode to allow such a power down. For this purpose a so-called inactivity timer is used. That is, the inactivity timer is restarted each time a data packet needs to be sent to the master. In case that the inactivity timer expires one will renegotiate the sniffed link to go into another sniffed link with a higher sniff interval. And perhaps that this sniff interval allows now the device to go into the deep sleep power mode. Driving the inactivity timer to the limit is thus a way to lower power consumption.

Changing sniff intervals during operation is not without risk. The inactivity timer is used to change sniff intervals into longer periods on expiration. In case that there is back application activity detected the device must go as fast as possible back to a sniffed link which meets the latency requirements. This usually means going into sniff mode with the smallest sniff interval. In the event that this negotiation time takes too long it might be that the device cannot report all the data it needs to. The Bluetooth specification doesn't provide any hard figures for response times to renegotiate the sniff parameters. Also, initiating a new sniffed link requires first to unsniff the existing link and next to sniff the link back. There is no other way to change the sniff parameters than this. The negotiation time on link manager level to go from a slow sniff to a fast sniff is implementation dependant. If this takes too long there is a risk that (since the device receives data that it needs to sent) the device has got no buffer space left anymore such that it needs to throw away valid data—this is the worst that can happen. This fact makes that interoperability testing for HID devices is still required.

In summary an HID device can go into several sniff states and low power modes so that making a good HID device with a very low power consumption is difficult. It requires a lot of device tuning, testing, debugging and interoperability testing.

SUMMARY OF THE INVENTION

According to a first aspect, the invention provides a master wireless, e.g. radio frequency, unit arranged to communicate with a slave wireless, e.g. radio frequency, unit by sending packets, the master unit having a controller arranged to address the slave unit to enable the slave unit to synchronize to the master unit, the master unit sending packets which if the slave unit sends a response thereto maintains an active link between the master unit and the slave unit. Although the master unit would normally expect a response from the slave unit, and could initiate a time out, the slave unit only needs to respond on some of the packets from the master unit when a response is expected in order to maintain an active link. This allows a slave unit to go into a low power mode operation for an extended period of time thus saving power. During the low power mode the slave unit may use a low power oscillator with a reduced accuracy. The accuracy may be as accurate as 20 ppm up to 250 ppm, for example, preferably from 50 ppm up to 250 ppm; most preferably from 100 ppm up to 250 ppm. The slave unit is preferably so adapted that it only responds to 10%, or 20%, or 30%, or 40%, or 50% of the number of packets for which a response is expected by the master unit. The master unit is adapted not to terminate an active connection when a slave unit does not respond to a one or a series of messages which can be responded to, i.e. the lack of one or a few responses does not make the master terminate the link. The lower the number of packets for which a response is required the more energy is saved. However, a possible disadvantage can be more uncertainty as to whether the link has been lost. Hence, there is a trade-off between energy saving, certainty of links and from that capacity of the system.

In embodiments of the present invention the master unit is adapted to suppress or eliminate a link supervision timeout for up to a certain period of time. This period of time may be the same as a link supervision timeout for periodic responses by the slave unit when normally maintaining an active connection, e.g. during a conventional sniff mode operation. Preferably, a slave wireless unit such as an HID device informs the master unit about the link supervision timeout value that needs to be used. This information can be transferred during connection setup. The link supervision timeout is used by both the master and slave units to monitor link loss. If, for any reason, no valid baseband packets are received for a duration longer than the link supervision timeout the connection is disconnected. This timer is reset each time a valid packet is received. The slave unit only needs to wake up when data needs to be sent. It first will resynchronize to the master unit. Also in order to avoid that the link is being declared as lost, it will need now and than to respond to the master unit in order to reset the master's link supervision timer, however the master unit is adapted not to terminate the link every time a response is due. This saves battery power of the slave unit. The slave unit stays always in the same sniff which has the added advantage of simplicity.

In a further embodiment of the present invention the master unit is adapted to suppress or eliminate a link supervision timeout for an extended period of time. This period of time may be longer than a link supervision timeout for periodic responses by the slave unit when normally maintaining an active connection, e.g. during a conventional sniff mode operation. Optionally, to enter into the special low mode operation the master and/or slave unit may initiate and/or negotiate the special low mode operation. For example, the Bluetooth standards provide various messaging protocols for entering into modes of operation, e.g. into the park, hold or sniff modes. Elements of these protocols may be advantageously used to provide activation of the modified sniff mode in accordance with the present invention. In case either the slave or the master unit is not adapted for the special operation, this negotiation will fail and this type of operation is not initiated.

Typically the slave unit will be battery powered. The packets may be sent using a frequency hop scheme. The addressing of the slave device includes addressing each slave device individually rather than broadcasting to all slave devices. A plurality of slave devices may be in communication with a master device. In this case, each slave device is addressed individually using a series of packets which, if a response is received from a slave unit, maintains an active connection. The packets are preferably associated with the relevant slave device address. The present invention is particularly useful in providing a deep sleep mode for an active connection. The master and one or more slave devices can exchange data once the one or more slave units have returned from the deep sleep mode. This allows a quality of service to be maintained even though packets which need no response are being sent for synchronization purposes.

The above scheme can help minimize the power used by the slave, while enabling the slave to maintain synchronization while keeping transmissions as few as possible. As much bandwidth as possible is made available for serving other slaves, and interference to other master units can be minimized.

The above method is preferably used when only discontinuous transmission, is allowed, i.e. at periodic intervals these intervals being the same as or longer than during normal operation. For example, the wireless units can use the Bluetooth standard, the slave can be in a sniff mode, the master can use a prescheduling of slots for transmit and receive packet pairs, allocated in advance, or the master can have a link supervision timer which it updates according to the response. The packets for prompting a response can be Bluetooth POLL packets for example. The master unit may also send packets needing no response, e.g. Bluetooth NULL packets, in between POLL packets.

This provides the advantage that it can still be determined whether a slave device is still present and synchronized, although this may be delayed to allow power saving on the slave unit. Data transmission can be initiated as fast as it is possible to return from a deep sleep as the sniff mode is still in progress as far as the master unit is concerned. In accordance with known techniques the slave device is not able to save power during prescheduling since it is not known in advance when the slave synchronizes. Thus, known techniques force a slave response via POLL packets. By removing the absolute requirement to answer POLL packets while providing means for inhibiting breaking of the connection in the master unit, the slave is allowed enough time to go into a deep sleep mode while still allowing a relatively rapid return to the conventional sniff mode.

As indicated above, in another aspect of the invention, a type of packet such as a POLL packets, which require a response from the slave can be optionally replaced with packets which require no response such as NULL packets when the slave is in a periodic communication mode such as the sniff mode and especially when the slave is in a deep sleep. As the master unit may expect the slave unit in a deep sleep not to respond to a POLL packet, there is no advantage in sending large numbers of POLL packets. By sending NULL packets in most of the Sniff attempt Tx slots a more optimal solution for scheduling POLL packets can be obtained which can result in reduction of interference on other piconets. As not sending a packet from the slave unit when the master unit expects a response does not provide clarity as to whether the slave is synchronized, the synchronization is only known after the response to a packet which requires a response. Depending on operation conditions or load, the master may wish to vary the time of uncertainty, i.e. to vary it by setting a different number of packets for which a lack of a response does not create a timeout or to set a maximum time out since sending the last POLL packet which received a response from the slave unit. Optionally, this maximum timeout can be negotiated with the slave unit during the time of setting up the special sniff mode operation in accordance with the present invention.

Another aspect of the invention provides a master or a slave unit able to provide the low power sniff mode operation according to the present invention. Yet another aspect of the invention provides consumer equipment having the master wireless unit or the slave unit. Another aspect provides software for implementing the controller of the master wireless unit or the slave unit. Another aspect provides a method of polling from a master wireless unit. Another aspect provides a sequence of wireless signals used to poll from a master wireless unit.

Any of the additional features may be combined with each other or with any of the aspects of the invention. Other advantages of the invention may be apparent to those skilled in the art, particularly in view of other prior art not known to the inventors. How the present invention may be put into effect will now be described with reference to the appended schematic drawings. Obviously, numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

The features of the invention will be better understood by reference to the accompanying schematic drawings, which illustrate preferred embodiments of the invention.

In the drawings.

DETAILED DESCRIPTION

The present invention will now be described with reference to certain embodiments and with reference to the above mentioned drawings. Such description is by way of example only and the invention is not limited thereto. In particular, the present invention will be described with reference to radio communications network but the present invention is not limited thereto. The term "wireless" should be interpreted widely to cover any communications system which does not use fixed wireline communications for some of its transmissions. Alternative wireless communications systems include optical systems such as those operating with diffuse infra-red. It should also be noted that the term "wireless" also includes so-called cordless systems. General aspects of cordless communications systems are described, for instance, in the book by W. Tuttlebee, "Cordless Telecommunications Worldwide", Springer, 1997, which is incorporated herein by reference. Cordless systems are generally local, uncoordinated radio communications networks having a limited range.

It will be noted, however, that all the embodiments of the present invention can be used with the Bluetooth™ protocol. A network operated in accordance with the Bluetooth™ may be described as an uncoordinated cellular system. Embodiments of the present invention may be limited to one or more of the following features of such a system: slow frequency hopping as a spread spectrum technique; master and slave units whereby the master unit can set the hopping sequence; each device has its own clock and its own address; the hopping sequence of a master unit can be determined from its address; a set of slave units communicating with one master all have the same hopping frequency (of the master) and form a piconet; piconets can be linked through common slave units to form a scatternet; Time Division Multiplex Transmissions (TDMA) between slave and master units; Time Division Duplex (TDD) transmissions between slaves and masters units; transmissions between slave and master units may be either synchronous or asynchronous; master units determine when slave units can transmit; slave units may only reply when addressed by a master unit; the clocks in each telecommunications device are free-running; uncoordinated networks, especially those operating in the 2.4 GHz license-free ISM band; a software stack to enable applications to find other Bluetooth™ devices in the area; other devices are found by a discovery/inquiry procedure; and hard or soft handovers.

With regard to frequency hopping, "slow frequency hopping" refers to the hopping frequency being slower than the modulation rate, "fast frequency hopping" referring to a hopping rate faster than the modulation rate. The present invention is not necessarily limited to either slow or fast hopping.

In addition, in the following reference will be made to "mobile terminals" however the present invention does not require that all user terminals be mobile. Fixed terminals, e.g. a desk top computer, may be used equally well with the present invention. Reference will also be made to "packets" but the present invention is not limited to packet switched systems. The term "packet based" refers to any system which uses packets of information for transmission purposes whether the system is packet or circuit switched or any other type.

Figure 1:
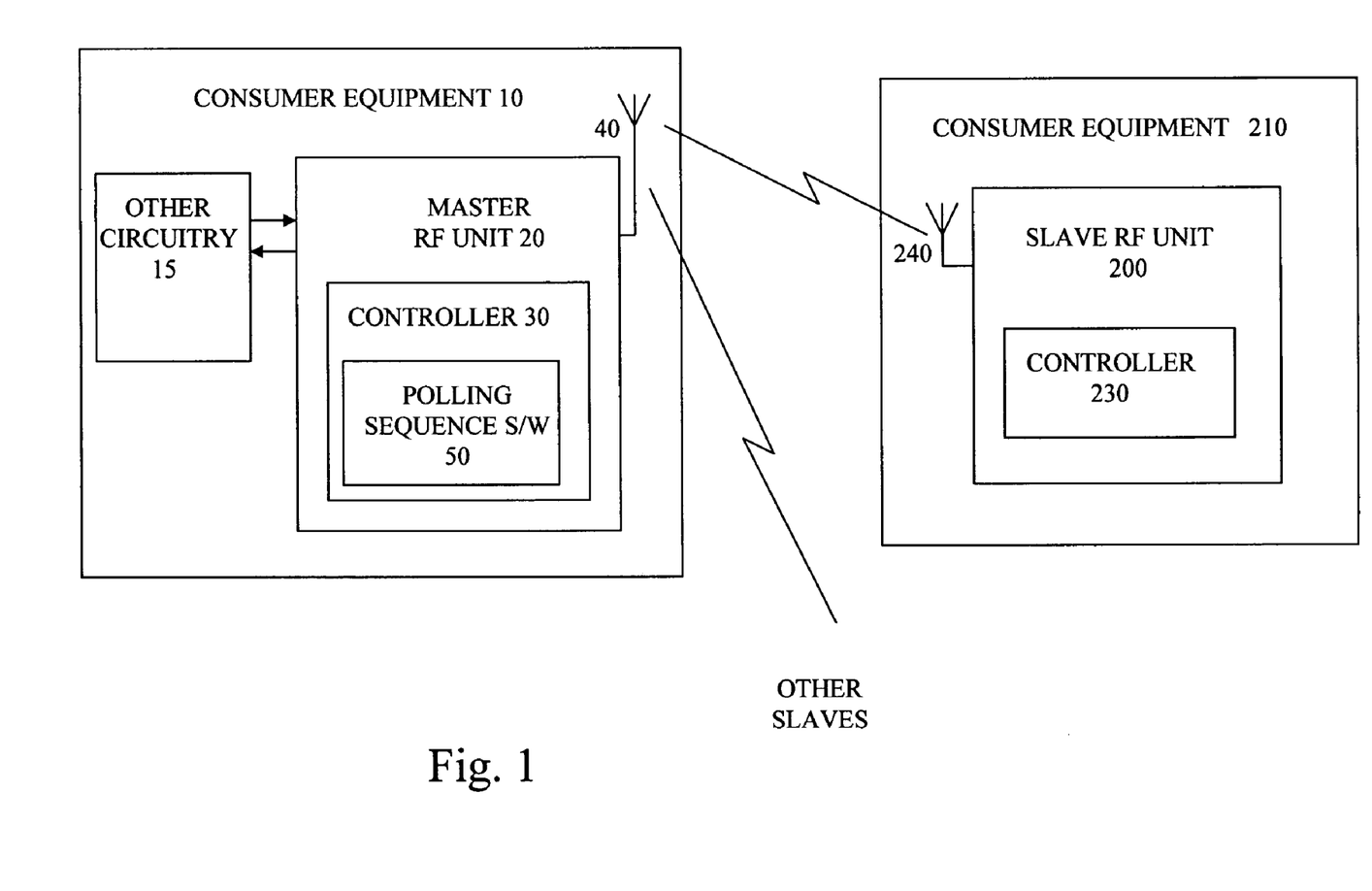
FIG. 1 is a schematic view of a Bluetooth master unit in consumer equipment as can be used with the present invention.

A first embodiment of the invention is shown in FIG. 1. A master RF unit 20 and a slave RF unit 200 are shown. As set out in the Bluetooth standard, the master is represented by the Bluetooth unit that initiates the connection (to one or more slave units). Note that the names 'master' and 'slave' only refer to the protocol on the channel: the Bluetooth units themselves are identical; that is, any unit can become a master of a piconet. Once a connection has been established, master-slave roles can be exchanged. The master radio frequency unit 20 has an antenna 40 for transmitting the Bluetooth radio signals over the air. In principle the RF signals can be transmitted over other media. The Bluetooth master unit is incorporated into consumer equipment 10. This can be mobile equipment such as a mobile phone, a smart phone, a cordless phone, a laptop or notebook computer or personal digital assistant for example, or other household equipment such as audio or video equipment, headsets, remote monitoring or sensing equipment and so on. Or it can be a PCMCIA card or a PCI card for a personal computer, a USB adapter or card, a modification for a PDA such as a cradle or plug-in to provide the Bluetooth capability, a Bluetooth access point, e.g. for a local area network, or an adapter for other commercial or household equipment with a radio link, e.g. in automotive vehicles and applications. It may also be a module which provides radio services and which may be included with other semiconductor devices, e.g. on a PCB. Data for transmission over the Bluetooth link is passed to the master unit from other circuitry 15.

The Bluetooth system supports not only a one-to-one link but also one-to-multi link. In the Bluetooth system, several communication devices can be organized and linked together about one communication device. The communication devices each are discriminated according to frequency hopping orders different from one another. The communication devices are linked as described above, to constitute a network called a piconet. The piconet means a component unit of a Bluetooth system which is constituted by connecting at least one slave to one master. One piconet can have one master and a maximum of 7 slaves. The master determines the overall characteristics of the channels in the piconet. The master has a Bluetooth Device Address (BD_ADDR) for determining the frequency hopping sequence and the channel access code. The clock of the master determines the phase of the hopping row and sets the timing of the same. Further, the master controls traffic in the channels by means of a controller. Any digital devices can function as the master, and after the piconet 10 is constituted, the master and the slave can exchange their roles.

The master and the slave carry out bilateral communication according to Time Division Duplex (TDD) in the unit of 1 hopping slot (e.g. 625 microseconds).

In a communication between the master and the slaves via TDD the channels allocated to time slots each have a length of 625 microseconds. The number of the time slots is determined according to the Bluetooth clock of the piconet master.

The master and the slaves can selectively transmit a packet via the time slots. For example, the master transmits the packet only in time slots designated with even numbers, and the slaves transmit the packet only in time slots designated with odd numbers. Further, it is necessary to realize that a packet transmitted by the master or the slaves is transmitted in 5 or less time slots. Herein, the packet means the unit of data transmitted in the piconet channel.

When the Bluetooth system is linked, the master can be operated in several power saving modes such as a hold mode, a sniff mode, and a park mode. The hold mode means a mode in which the master converts into a sleep state while possessing an Active Member Address (AM_ADDR) when linked to the slave. The sniff mode means a mode in which the listening interval is prolonged while the master possesses the AM_ADDR when linked to the slave. The park mode means a mode in which the master converts into the sleep state by opening the AM_ADDR when linked to the slave. Before transfer into the park mode, a Parked Member Address (PM_ADDR) or an Access Request Address (AR_ADDR) is transmitted from the master.

Return from the park mode to normal operation takes time and can result in data loss. Hence, in accordance with the present invention the Active Member Address (AM_ADDR) is maintained during a modified sniff mode which allows more significant power savings than the conventional sniff mode.

The AM_ADDR is expressed as a member address and used for discriminating active members participating in the piconet. When at least two slaves link to one master, the master allocates a preliminary 3 bit address which will be used until the slaves each are activated in order to discriminate the slaves. Therefore, all packets exchanged between the master and the slaves carry the AM_ADDR. The AM_ADDR of the slave is used not only in a packet from the master to the slave but also in a packet from the slave to the master. A pre-allocated AM_ADDR is resigned when the slave is not linked to the master or the slave is in the park mode, and a new AM_ADDR is allocated when the slave is linked to the master again. The piconet is restricted into one master and seven slaves since the AM_ADDR allocated to the activated slaves by the master is designated to be 3 bits long according to Bluetooth standard. In other words, the piconet has the maximum of eight addresses, but the "000" address is used by the master for broadcasting to the slaves, and the remaining seven addresses from "001" to "111" are used by the slaves.

A communication device in one piconet can carry out data communication with any communication devices in another piconet. A plurality of piconets are linked to constitute a network called a scatternet.

The scatternet is comprised of at least two piconets which are gathered to constitute a new network where each of the piconets maintains its unique hopping frequency. Further, it is requested that communication devices constituting the scatternet can be inevitably converted between the scatternet communication and the piconet communication.

When a Bluetooth system belongs to the scatternet, a device may operate as a master in one net while operating as a slave at the same time to another master. In other words, the Bluetooth system is necessarily capable of transmitting/receiving data to/from at least two external devices respectively belonging to different piconets while preventing collisions between the transmitted data.

As indicated above, the master unit has a controller 30 for executing a packet sending sequence and other sequences. The controller is typically in the form of a microprocessor or other conventional hardware such as application specific circuitry or sequencers. The packet sending sequence may be in the form of software 50 which can be embedded in ROM or other memory, or be in removable or rewritable form. The software for implementing the packet sending sequence and other control sequences can be written in conventional computer readable code or languages, for execution by the controller. The slave RF unit 200 has a similar controller 230. Other parts of the units are not shown for the sake of clarity, and the reader is referred to the well known Bluetooth specification for more details.

Figure 2:
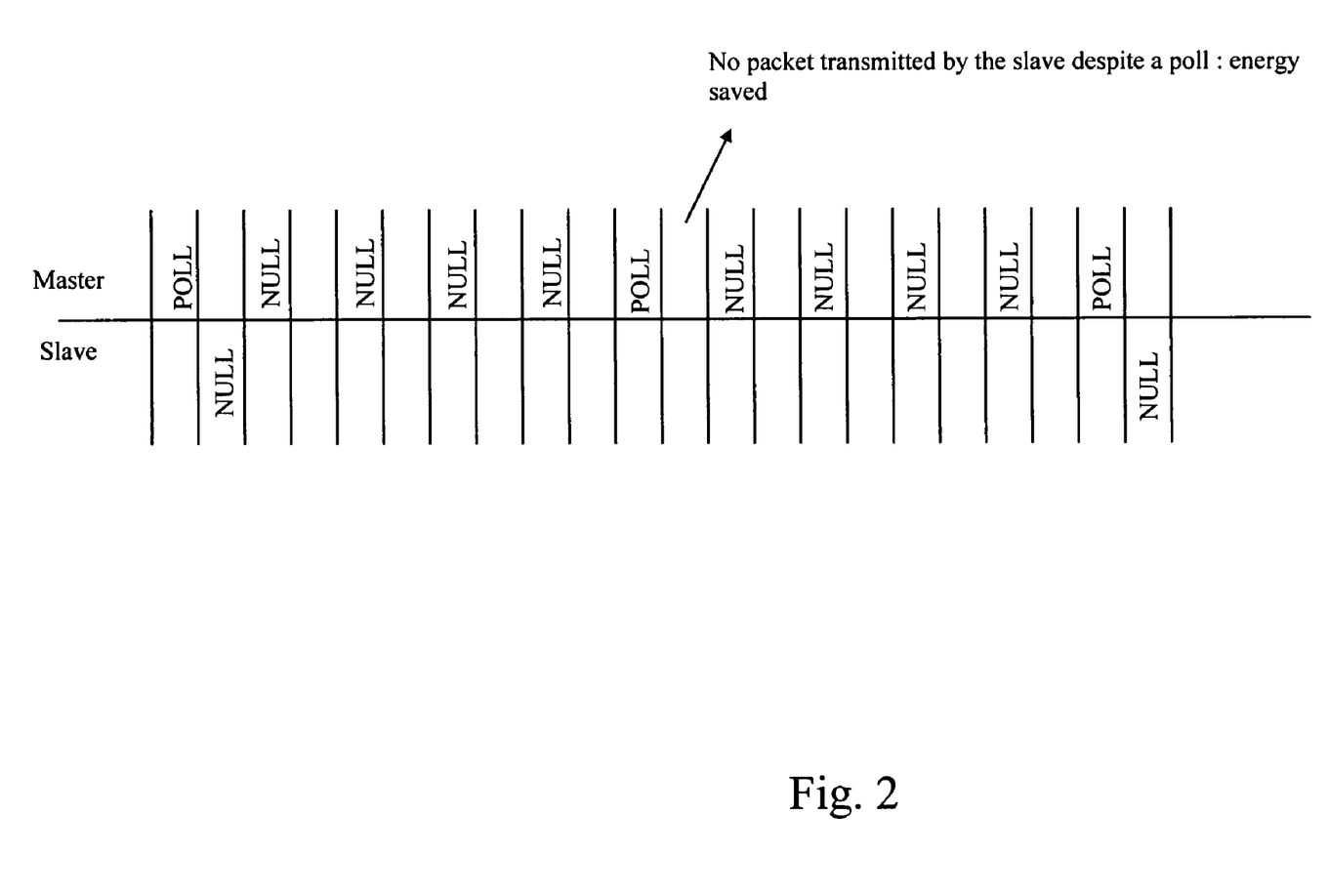
FIG. 2 is a time sequence of packets sent during the polling from a master to a slave according to an embodiment of the present invention.

FIG. 2 shows an example of a packet sending sequence for the link of FIG. 1. In this figure, the upper row shows a sequence of master time slots and the lower row shows slave slots. The master may need to schedule slots to serve many slaves, and many scheduling schemes have been proposed to provide fair and efficient sharing.

The master's prescheduling algorithm allocates in advance a block of transmit and receive Tx/Rx packet pairs as shown. A Tx NULL is followed immediately by an Rx slot, though the slave need not respond to the NULL. After a number of these pairs, there is a Tx POLL followed by an Rx slot, and this is repeated. The slave may use the Rx slot to respond to the POLL packet, however in the special adaptation of the sniff mode in accordance with the present invention it does not need to do so—at least not for every POLL packet sent. Instead it can go into deep sleep. That is, it can power down its transceiver and optionally switch to a low power, less accurate oscillator. For this purpose each communications device has a means for switching between a more accurate and a less accurate local oscillator. The less accurate oscillator may be as accurate as 20 ppm up to 250 ppm, for example, preferably from 50 ppm up to 250 ppm; most preferably from 100 ppm up to 250 ppm. It is only necessary for the slave unit to wake up and respond to a master POLL packet every now and again—often enough so that there is no link time out in the master unit. The slave unit is preferably so adapted that it only responds to 1%, or 5%, or 10%, or 20%, or 30%, or 40%, or 50% of the number of packets for which a response is expected by the master unit. The percentage depends on how much the modified sniff mode in accordance with the present invention allows a slave unit not to respond over a long period of time. This is an optimization exercise—a slave unit which has switched off or gone out of range will take up an address in the piconet until the master unit times out. Ideally, this time out should be selected long enough so that a slave unit can enter a deep sleep mode but short enough so that a piconet's resources are not restricted unnecessarily. In the example shown, there are 4 NULL packets transmitted by the master unit between each of the POLL packets. However, the slave unit does not respond to all POLL packets. Even if all the NULL packets were POLL packets the slave would not respond to them all. In the case shown the slave unit only replies every $10^{th}$ packet from the master unit, whereby it only misses one POLL packet. The number of responses to POLL packets or the duration between sending responses to POLL packets can be determined according to the application. Other sniff parameters such as sniff interval, sniff attempts and sniff timeout are under the control of the application running on top of the Bluetooth system. Generally, an application should take into account: the maximum allowed latency which will determine the sniff interval; the throughput/bandwidth needed while in the sniff mode: this determines the number of attempts after the sniff interval is known, when taking into account peak bandwidth and average bandwidth, the sniff attempts and sniff timeouts can be determined; increasing the number of sniff attempts for longer sniff intervals especially when there are bad radio conditions.

The number of NULL and POLL packets can be the same number of POLL packets which would have been used before replacement of some of the POLL packets with NULL packets. The number of NULL packets can be greater than or equal to the number of sniff attempts. The number of attempts is preferably thereby respected and timeout slots allowed for.

The NULL packets and any type of packets contain the channel access code from which timing information can be derived to enable synchronization, as is well known. Since the slave has not needed to respond to the NULL packets nor to respond to some of the POLL packets, it has been able to save the energy used in transmission, which is of course much greater than is used for reception or internal processing. In addition it has been able to power down into a very low power mode using a low power and a less accurate oscillator which provides a further saving in power. This means battery life can be extended, which is critical for many applications.

The present invention also includes as an embodiment a means for determining battery power in a slave unit and a means in the slave unit for initiating the modified sniff mode in accordance with the present invention if the battery charge level is low. These means may include means for forcing the master unit into low power sniff mode in accordance with the present invention in such a case. By forcing the low power sniff mode in accordance with the present invention, battery power is saved, e.g. more time is allowed for the slave unit to be transferred to a cradle for charging of its battery.

Clearly the advantages are applicable beyond Bluetooth to other similar RF protocols. They can apply wherever there is polling to maintain synchronization or to maintain awareness of other devices within range. This sort of synchronization is needed for any type of frequency hopping system, if a connection is to be maintained with minimum power consumption. The synchronization state of slaves can be recorded in ways other than a link supervision timer. Although shown for a case with prescheduling, it is applicable to masters which are not using this or use it selectively.

From the above it follows that an HID slave device in accordance with the present invention need only reply to the master device when it has got data to send. In all other cases it can be in its deep sleep power mode. The master device is in a state in which there is a sniffed link with the slave unit, e.g. the master unit can operate at it's shortest sniff interval, i.e. able to respond fastest when the slave wakes up. The slave device need only reply to the master device when it has got real data to send. In all other cases it will be in the deep sleep power mode. When the slave device has got no data to send it doesn't reply any longer with a NULL packet. This means that even for a sniff link it is able to go into the deep sleep power mode. The slave unit only wakes up when data needs to be sent. It will first resynchronize to the master unit. Also in order to avoid that the link is being declared as lost, it will need now and than to respond to the master device in order to reset the masters link supervision timer. It always stays in the same sniff. Precisely this concept allows simplicity. Also renegotiation is no longer needed, which reduces device complexity and solves the issue about vendor specific response times for sniff link renegotiations. There is no requirement for changes to the Bluetooth protocols. The link supervision timer of the master unit should not expire simply because a lower number of responses to POLL packets ahs been received. So, by the slave device responding now and than to the master device with a NULL packet, this will make sure that the link is never dropped.

In a further embodiment of the present invention the master unit is adapted to suppress a link supervision timeout for an extended period of time. This period of time may be longer than a link supervision timeout for periodic responses by the slave unit when normally maintaining an active connection, e.g. during a conventional sniff mode operation. Optionally, to enter into the special low mode operation the master and/or slave unit may initiate and/or negotiate the special low mode operation. For example, the Bluetooth standards provide various messaging protocols for entering into modes of operation, e.g. into the park, hold or sniff modes. Elements of these protocols may be advantageously used to provide activation of the modified sniff mode in accordance with the present invention. In case either the slave or the master unit is not adapted for the special operation, this negotiation will fail and this type of operation is not initiated.

The present invention also includes executable software which can be executed on a controller of a master wireless unit to control communications with a slave wireless unit by sending packets. The software may contain code which when executed is arranged to address the slave to enable the slave to synchronize to the master. The software code may be arranged to initiate sending of a first number of packets during an active link for which if a response is obtained from a slave unit to such a packet, this is able to maintain the link. These packet may be ones which would normally prompt a response from the slave unit. The software may also include code, which when executed causes the packets to be sent using a frequency hop scheme. The software code may be arranged to implement the Bluetooth standard for communicating with the slave unit, e.g. when the slave unit is in a mode, in which it periodically listens to transmissions from the master unit. The software may include code, which when executed is arranged to use prescheduled slots for transmit and receive packet pairs, allocated in advance for the polling. The software code when executed may include a link supervision timer which it can update according to packets received from the remote device. This link supervision timer may be so adapted that the master unit does not break an active connection even if a slave unit is so adapted that it only responds to 10%, or 20%, or 30%, or 40%, or 50% of the number of occasions at which a response is expected by the master unit. The software is preferably written in a high level language and then compiled on a compiler which is adapted for a microprocessor used within the controller of the master unit. Alternatively, the software may be written for implementation on a programmable digital logic device, such as a Programmable Gate Array, especially a Field Programmable Gate Array (FPGA).

As described above, a Bluetooth master radio frequency unit addresses a slave radio frequency unit, to enable the slave to synchronize to the master, by sending packets for which a response from the slave would maintain an active link. The slave unit does not need to respond to all of the packets which are expected to elicit a response. Instead the slave unit may go into a deep sleep mode, i.e. power down its transceiver and only wake up at intervals. This approach allows the slave to preserve more power while still allowing the master to detect whether the slave has resynchronized or not (and thus to update a Link Supervision Timer for example). Notably this is also suitable for use in prescheduling implementations.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A wireless system comprising a master wireless unit arranged to communicate with a slave wireless unit by sending packets, the master unit having a controller arranged to address the slave unit to enable the slave unit to synchronize to the master unit in an active link by sending a number of first packets down the link for which if a response is received from the slave unit, the active link is maintained, the slave unit being adapted to respond to some, but not every first packet, wherein the slave unit is in a low power mode operation for as long as the slave unit receives the first packets but is not required to respond to every first packet.

2. The wireless system according to claim 1, wherein during the low power mode operation the slave unit uses a low power oscillator.

3. The wireless system according to claim 2, wherein the oscillator is accurate to 20 ppm up to 250 ppm, preferably from 50 ppm up to 250 ppm; most preferably from 100 ppm up to 250 ppm.

4. The wireless system according to claim 1, wherein the slave unit is adapted so that it only responds to 1%, or 5%, or 10%, or 20%, or 30%, or 40%, or 50% of the number of first packets for which a response is expected by the master unit.

5. The wireless system according to claim 1, wherein the master unit is adapted not to terminate the active link when the slave unit does not respond to one or a series of messages for which a response maintains the link.

6. The wireless system according to claim 1, wherein the master unit is adapted to address an individual slave unit when sending the first packets.

7. The wireless system of claim 1, wherein the first packets are sent using a frequency hop scheme.

8. The wireless system of claim 1, wherein the master unit is arranged to use a Bluetooth standard for communicating with the slave unit.

9. The wireless system of claim 1, wherein the slave unit is in a mode, in which it periodically listens to transmissions.

10. The wireless system according to claim 1, wherein the master unit has a link supervision timer which it can update according to responses from the slave unit.

11. The wireless system according to claim 1, wherein the master unit sends second packets to the slave unit which do not require a response from the slave unit.

12. The wireless system according to claim 11, wherein the second packets are Bluetooth NULL packets.

13. A master wireless unit for use with a wireless system, the master unit being arranged to communicate with a slave wireless unit by sending packets, the master unit having a controller arranged to address the slave unit to enable the slave unit to synchronize to the master unit in an active link by sending a number of first packets down the link for which if a response is received from the slave unit, the active link is maintained, wherein the slave unit is in a low power mode operation for as long as the slave unit receives the first packets but is not required to respond to every first packet, the master unit being adapted to maintain the active link if the slave unit responds to some of the first packets but does not respond to every first packet, wherein the first packets prompt a response from the slave unit.

14. The master wireless unit according to claim 13, wherein the master unit is adapted to address an individual slave unit when sending the first packets.

15. The master wireless unit according to claim 13, wherein the first packets are sent using a frequency hop scheme.

16. The master wireless unit of claim 13, wherein the master unit is arranged to use a Bluetooth standard for communicating with the slave unit.

17. The master wireless unit according to claim 13, wherein the master unit has a link supervision timer which it can update according to responses from the slave unit.

18. The master wireless unit according to claim 13, wherein the master unit sends second packets to the slave unit which do not require a response from the slave unit.

19. The master wireless unit according to claim 18, wherein the second packets are Bluetooth NULL packets.

20. Consumer equipment having the master unit of claim 13.

21. A computer readable medium encoded with a program for implementing the controller of the master wireless unit of claim 13.

22. A slave wireless unit for a wireless system, the slave unit being adapted for communication with a master wireless unit by sending packets, the slave unit having a controller arranged to receive first packets from the master unit to enable the slave unit to synchronize to the master unit in an active link following transmission by the master unit of a number of the first packets down the link for which if a response is sent from the slave unit, the active link is maintained, the slave unit being adapted to respond to some but not to respond to every received first packet, wherein the slave unit is in a low power mode operation for as long as the slave unit receives the first packets but is not required to respond to every first packet.

23. The slave wireless unit according to claim 22, wherein during the low power mode operation the slave unit uses a low power oscillator.

24. The slave wireless unit according to claim 22, wherein the oscillator is accurate to 20 ppm up to 250 ppm, preferably from 50 ppm up to 250 ppm; most preferably from 100 ppm up to 250 ppm.

25. The slave wireless unit according to claim 22, wherein the slave unit is adapted so that it only responds to 1%, or 5%, or 10%, or 20%, or 30%, or 40%, or 50% of the number of first packets for which a response is expected by the master unit.

26. Consumer equipment having the slave unit of claim 22.

27. A computer readable medium encoded with a program for implementing the controller of the master wireless unit of claim 22.

28. A method of using a master wireless unit to communicate with a slave wireless unit by sending packets, and to address the slave to enable the slave unit to synchronize to the master unit in an active link, the method comprising: sending from the master wireless unit to the slave wireless unit, a number of first packets for which a response from the slave unit is sufficient to maintain the active link, the slave unit not responding to all but responding to some of the first packets, wherein the slave unit is in a low power mode operation for as long as the slave unit receives the first packets but is not required to respond to every first packet.

* * * * *

UNITED STATES PATENT AND TRADEMARK OFFICE
CERTIFICATE OF CORRECTION

PATENT NO. : 7,653,017 B2 Page 1 of 1
APPLICATION NO. : 11/045806
DATED : January 26, 2010
INVENTOR(S) : Marc Huylebroeck It is certified that error appears in the above-identified patent and that said Letters Patent is hereby corrected as shown below:

On the title page, item (74) should read:
(74) *Attorney, Agent, or Firm* – Lisa K. Jorgenson; James H. Morris; Wolf, Greenfield & Sacks, P.C.

Signed and Sealed this

Ninth Day of March, 2010

David J. Kappos
*Director of the United States Patent and Trademark Office*

UNITED STATES PATENT AND TRADEMARK OFFICE
CERTIFICATE OF CORRECTION

PATENT NO.      : 7,653,017 B2                                    Page 1 of 1
APPLICATION NO. : 11/045806
DATED           : January 26, 2010
INVENTOR(S)     : Marc Huylebroeck It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 632 days.

Signed and Sealed this

Twenty-third Day of November, 2010

David J. Kappos
*Director of the United States Patent and Trademark Office*